June 28, 1927.
C. H. SEMPLE
1,634,161
INNER TUBE FOR AUTOMOBILE TIRES
Filed Feb. 3, 1926
2 Sheets-Sheet 1
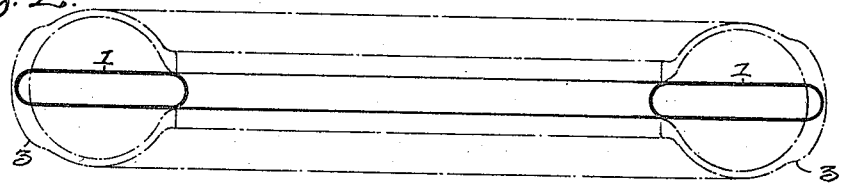
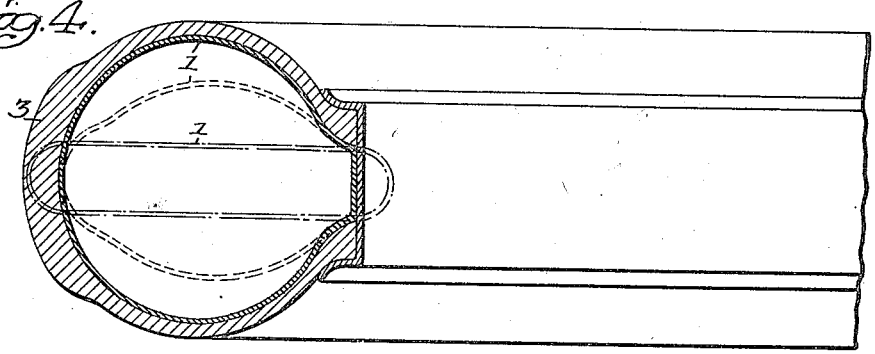
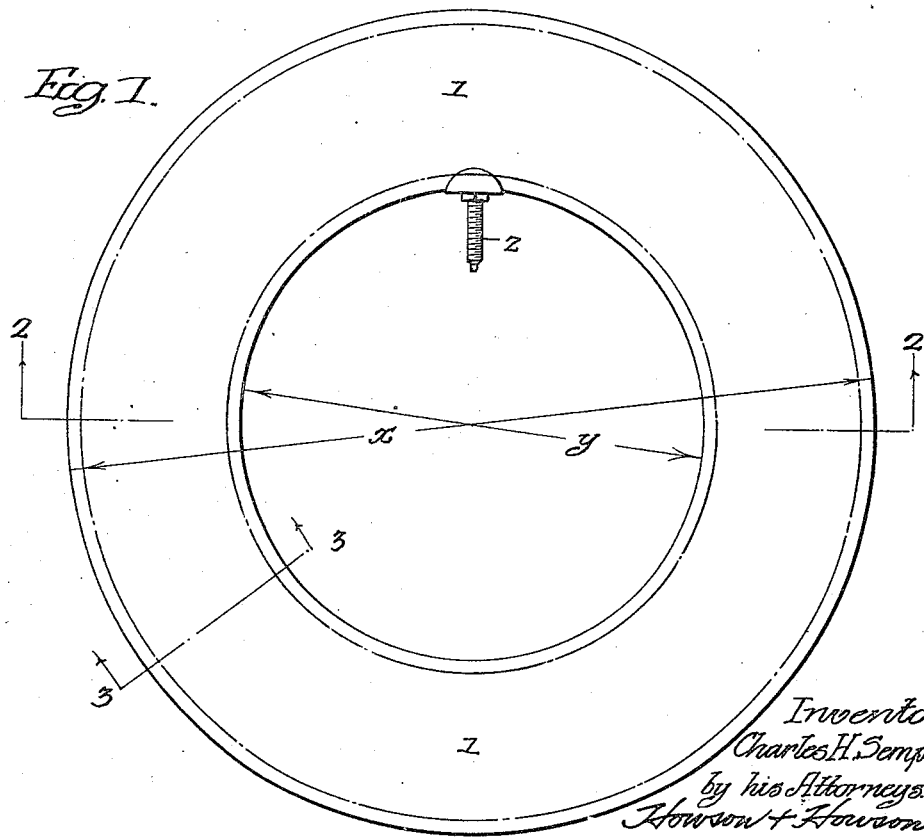

June 28, 1927.
C. H. SEMPLE
1,634,161
INNER TUBE FOR AUTOMOBILE TIRES
Filed Feb. 3, 1926
2 Sheets-Sheet 2
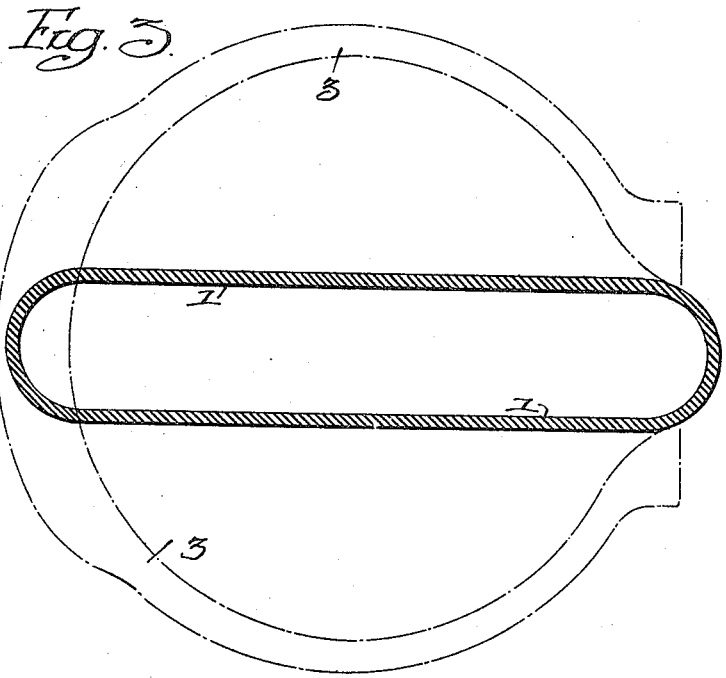
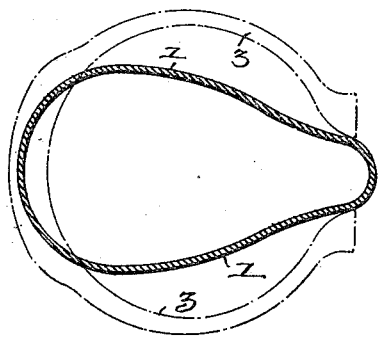
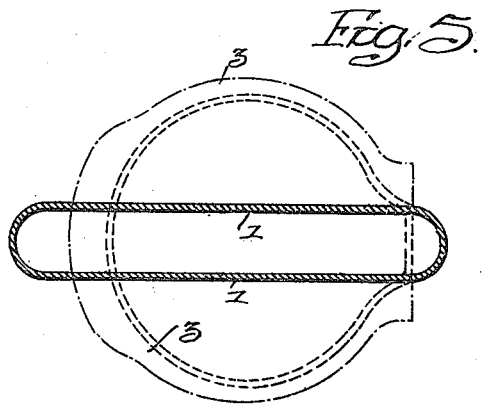
Inventor:
Charles H. Semple.
by his Attorneys.
Howson & Howson Patented June 28, 1927.

1,634,161

UNITED STATES PATENT OFFICE.

CHARLES H. SEMPLE, OF CANTON, OHIO, ASSIGNOR TO SEMPLE-LEE PROCESSES, INC., OF AKRON, OHIO, A CORPORATION OF DELAWARE.

INNER TUBE FOR AUTOMOBILE TIRES.

Application filed February 3, 1926. Serial No. 85,735.

This invention relates to inner tubes for tires and its chief objects are to provide an inner tube adapted for easy insertion into the tire casing; for a snug fit of the tube within the casing without objectionable tension of any part of the tube and without buckling of the tube; for compression of rubber within the tread portion of the tube, to avoid leakage in case of puncture, without expensive provision for obtaining such compression; and for economy of manufacture in other respects.

I attain these objects by making the tube of such oblate cross-sectional form and of such size that when uninflated it will be in cross section more extensive in a radial than in an axial direction but will have a cross-sectional perimeter approximately equal to or but little less than the cross-sectional perimeter of the tire cavity it is to occupy, so that it can be inflated into contact with the entire inner face of the tire carcass without objectionable transverse stretching.

In giving the tube such form and size in cross-section, which requires that the uninflated tube be more extensive in a radial direction than the cavity it is to occupy, I preferably give it such proportions that its outer longitudinal circumference will be greater than the outer longitudinal circumference of the tire cavity and its inner longitudinal circumference will be less than the inner longitudinal circumference of the tire cavity, which is to say that its out-side diameter will be greater than the out-side diameter of the tire cavity and its in-side diameter will be less than the in-side diameter of the tire cavity, but my invention is not wholly limited to a tube having the described deviation from tire cavity size at both the inner and outer periphery.

In the accompanying drawings:

Fig. 1 is a plan view of my improved inner tube for automobile or other vehicle tires;

Fig. 2 is a sectional view on the line 2—2, Fig. 1, showing the inner tube in full lines and the tire casing in dotted lines, the inner tube being deflated;

Fig. 3 is an enlarged sectional view on the line 3—3, Fig. 1;

Fig. 4 is an enlarged sectional view through the tube and tire casing, showing the inner tube inflated and engaging the inner walls of the tube cavity of the tire casing;

Fig. 5 is a view showing the relation of the inner tube to a tire casing when substantially no stretch of the tube is desired when the tube is inflated within the casing; and Fig. 6 is a sectional view showing an inner tube of pear-shape in cross section and embodying the principles of my invention.

Referring to the drawings, the inner tube of an automobile or other vehicle tire is indicated at 1. The tube may be shaped into an annular form as it is extruded from the tube-forming machine, in a hot or plastic state. The ends of the tube are joined in any suitable manner, and the air-valve 2 can also be attached in any manner desired.

The tube, as it is formed, is given the oblate cross-sectional shape above described, as shown in Fig. 2, its outside diameter "$x$" (Fig. 1) being greater than the outside diameter of the tube cavity of the tire casing 3, while the inside diameter "$y$" (Fig. 1) of the tube 1 is less than the diameter of the casing at the beads, so that when the tube is placed in the casing and inflated, as shown in Fig. 4, the tread portion of the tube will be held to an inwardly drawn position by the outward bulging of its side walls. This puts the rubber in the outer portion of the tread-wall of the tube under compression, both because of the flexing inward of the tread-wall from its uninflated form and because of the reduction in circumferential length of the tread-wall. The inflation of the tube also first forces the inner periphery of the tube lightly to assume its proper position in the tire casing, with a slight longitudinal and transverse stretch such as to assure the avoidance of all wrinkling of the tube at the beads, and then, after the side walls of the tube are stopped by contact with the casing further inflation firmly sets the slightly stretched inner peripheral wall of the tube against the enclosing structure of tire-casing and rim. The action can best be understood by visualizing the tube as being inflated while unconfined. The pull of the side-walls upon the tread portion is balanced against their outward pull upon the inner periphery of the tube, so that the mean diameter remains substantially the same, and the foreshortening of the longitudinal circumference of the tread portion is effected by forces acting in an infinite number of directions and at every infinitesimally small part of the circumference, so that the tread rubber is put under compression without buckling.

I have shown in Figs. 1, 2, 3 and 4 such ratio in the transverse peripheral lengths or perimeters of the inner tube and the casing that there is a considerable transverse stretch of the material of the inner tube when inflated, and in Fig. 5 I have illustrated a condition in which there is substantially no transverse stretch of the inner tube, the outside diameter of the tube being considerably greater than the greatest diameter of the tube cavity of the casing, and the inner diameter of the tube being much less than that of the casing at the beads, the transverse length of the tube wall being more nearly equal to that of the wall of the casing in Fig. 5 than it is in Fig. 2.

In this embodiment of my invention a very low grade of rubber compound or other material can be used for the inner tube, as there is substantially no transverse stretch of the material when the inner tube assumes the shape of the inner walls of the casing, and the percentage of longitudinal stretch in the inner peripheral wall of the tube, nevertheless, is not so great as to be of substantial consequence.

A further advantage of my invention is that a large number of the tubes may be simultaneously vulcanized in a stack of molds of given height, with consequent economy of equipment.

In Fig. 6 I have shown the invention as applied to a molded tube, of pear-shape in cross section, the outer diameter of this tube being greater than the outer diameter of the tube cavity of the casing to which it is applied, and the inner diameter of the tube being preferably less than the inner diameter of the casing at the beads. The amount of departure will depend upon the amount of stretch desired and the character of the material of the inner tube.

I claim:

1. The combination of an inner tube and a tire casing therefor, said inner tube when in a deflated condition being of oblate cross-sectional form and having a greater outside diameter than the outside diameter of the tube cavity of the tire casing and a cross-sectional perimeter not greater than that of the tube-cavity of the casing, the construction of the tube at its inner periphery being such that by its resistance to outward pull of the side walls upon inflation of the tube, the tube will be caused to assume substantially the size and shape of the cavity before developing substantial binding pressure of the tube against the casing.

2. The combination of an inner tube and a tire casing therefor, said inner tube when in a deflated condition being of oblate cross-sectional form and having a greater outside diameter than the outside diameter of the tube cavity of the tire casing, the cross-sectional perimeter of the tube when uninflated being approximately equal to that of the tire cavity.

3. The combination of an inner tube and a casing therefor, said inner tube when in a deflated condition being of oblate cross-sectional form and having a greater outside diameter than the outside diameter of the tube cavity of the casing, and the inside diameter of the tube being less than the inside diameter of the casing at the beads.

4. A combination as defined in claim 3 in which the cross-sectional perimeter of the tube when uninflated is approximately equal to that of the tire cavity.

5. In combination with a tire casing, an inner tube therefor of oblate cross-sectional form and in cross section more extensive in a radial than in an axial direction, the inside diameter of the tube being less than the inside diameter of the tire cavity, the cross-sectional perimeter of the tube being not greater than that of the tire cavity, and the construction of the tube at its outer periphery being such that by its resistance to inward pull of the side walls upon inflation of the tube the protruding inner periphery of the tube will be drawn into the casing by the pull of the outwardly bulging side walls.

6. In combination with a tire casing, an inner tube therefor of oblate cross-sectional form and in cross-section more extensive in a radial than in an axial direction, the inside diameter of the tube being less than the inside diameter of the tire cavity, and the cross-sectional perimeter of the tube when uninflated being approximately equal to that of the tire cavity.

CHARLES H. SEMPLE.